US007870001B2

(12) United States Patent
Jokipii

(10) Patent No.: US 7,870,001 B2
(45) Date of Patent: *Jan. 11, 2011

(54) MULTI-LANGUAGE SYSTEM FOR ONLINE COMMUNICATIONS

(75) Inventor: Eron A. Jokipii, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/139,612

(22) Filed: Jun. 16, 2008

(65) Prior Publication Data

US 2008/0270113 A1    Oct. 30, 2008

(51) Int. Cl.
*G10L 11/00*    (2006.01)
*G06F 17/28*    (2006.01)
*G06F 17/20*    (2006.01)

(52) U.S. Cl. .................... 704/270.1; 704/2; 704/4; 704/8

(58) Field of Classification Search .............. None
See application file for complete search history.

(56) References Cited

U.S. PATENT DOCUMENTS

| 5,974,372 | A | * | 10/1999 | Barnes et al. | 704/8 |
| 6,092,036 | A | * | 7/2000 | Hamann | 704/8 |
| 6,092,037 | A | * | 7/2000 | Stone et al. | 704/8 |
| 6,389,386 | B1 | * | 5/2002 | Hetherington et al. | 704/8 |
| 6,490,547 | B1 | * | 12/2002 | Atkin et al. | 704/8 |
| 6,493,661 | B1 | * | 12/2002 | White et al. | 704/8 |
| 6,496,793 | B1 | * | 12/2002 | Veditz et al. | 704/8 |
| 6,901,361 | B1 | * | 5/2005 | Portilla | 704/8 |
| 7,752,266 | B2 | * | 7/2010 | Grove | 709/206 |

* cited by examiner

*Primary Examiner*—Brian L Albertalli
(74) *Attorney, Agent, or Firm*—James J. DeCarlo; Greenberg Traurig, LLP

(57) ABSTRACT

An online communications system for converting language. The language conversion is achieved by first storing words and phrases corresponding to a language key and a unique key value in a table at both the transmitting and receiving ends of the communication. The computer located at the transmit end receives and converts the word or phrase into the unique key value and transmits the unique key value to the computer at the receiving end. The computer at the receiving end receives and converts the unique key value into the corresponding word or phrase.

31 Claims, 5 Drawing Sheets

MULTI-LANGUAGE SYSTEM FOR ONLINE COMMUNICATIONS

CROSS REFERENCE TO RELATED APPLICATIONS

This application claims the benefit of U.S. patent application Ser. No. 09/717,822, filed Nov. 20, 2000, entitled MULTI-LANGUAGE SYSTEM FOR ONLINE COMMUNICATIONS.

BACKGROUND OF THE INVENTION

This invention relates to the field of online communications and more particularly, to a system and method for facilitating communications between two or more individuals in multiple languages.

SUMMARY OF THE INVENTION

The Internet is a global communications network linking users (actually linking their computers) from every continent and every country around the world. Computers, unlike humans, communicate with one another using standards-based communications protocols like Transmission Control Protocol/Internet Protocol (TCP/IP). E-mail, for example, is sent from the user's computers to mail servers and back again to user's computers using the Simple Mail Transfer Protocol (SMTP). Technically, the Internet works seamlessly because all the computers and servers "talk" the same the "language."

However, unlike computers, for the humans who live, work and even play on the Internet, there is no universal language. Nor is any one language a default language for Internet users. On the Internet there is a language barrier. Further, both Cultural and educational challenges make it unlikely that any universal language for Internet users will be adopted; despite the fact that having no universal language is the single most inhibiting factor slowing the effectiveness of the Internet for collaboration among users of dissimilar languages.

As is often the case with many forms of new technology, new ideas emerge to lessen problems and aid its broader use. One such solution to the Internet language barrier is language translation software (both in the form of stand alone software, and its Internet implementation on language translation web sites), which allow users to input text in one language and receive a translation in a second language. However, translation software is lacking because it requires users to first access a different application or visit a web site; and second, it requires users retype or copy and paste the translation to send a message. Additionally, translation software and web sites often use "general" translation tables and often fail to correctly translate esoteric words and phrases specific to certain specialized topics. This limitation greatly limits their effectiveness for Internet-based applications due to the specialized nature and meaning of words and phrases.

One Internet application where users benefit by communicating in their native language is multi-player online interactive games. During multi-player online interactive games players often hail from all points of the globe, and speak in many different languages. The dissimilar languages of the players often reduces, or eliminates altogether, interaction between players. Ultimately this dampens the multi-player experience because users cannot interact with each other.

Another Internet application where users benefit by communicating in their native language is collaborative project development efforts, such as computer software programming. One such effort, the development of the Linux open-source operating system, was such a collaborative effort which involved thousands of programmers from around the world. This effort was undertaken in several primarily languages, including English and Finnish. However, many of the programmers who didn't speak either language were at a severe disadvantage.

Table A. depicts a sample server language conversion lookup table;

Table B. depicts a sample client language conversion lookup table.

Figure 5:
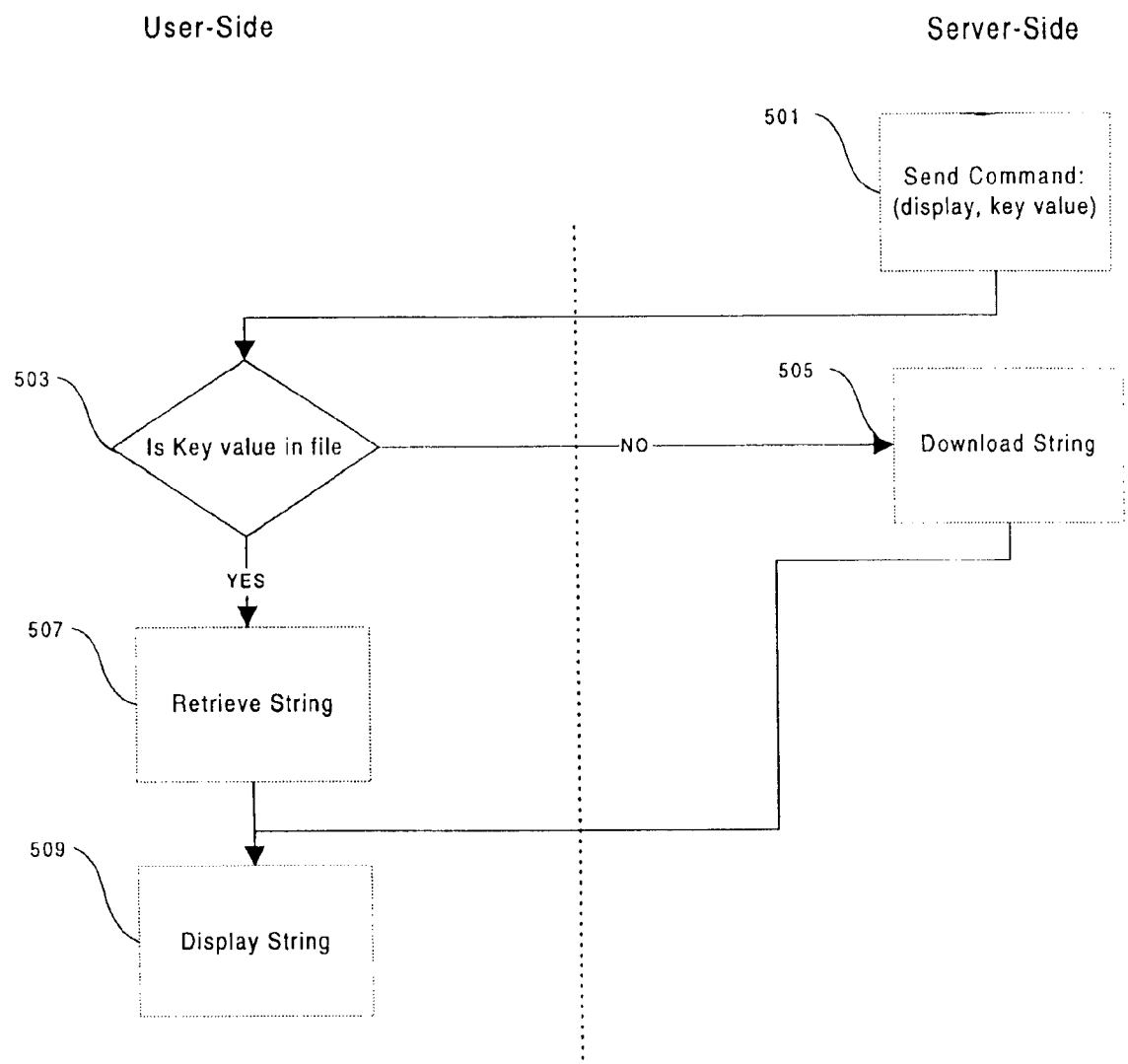
Figure 6:
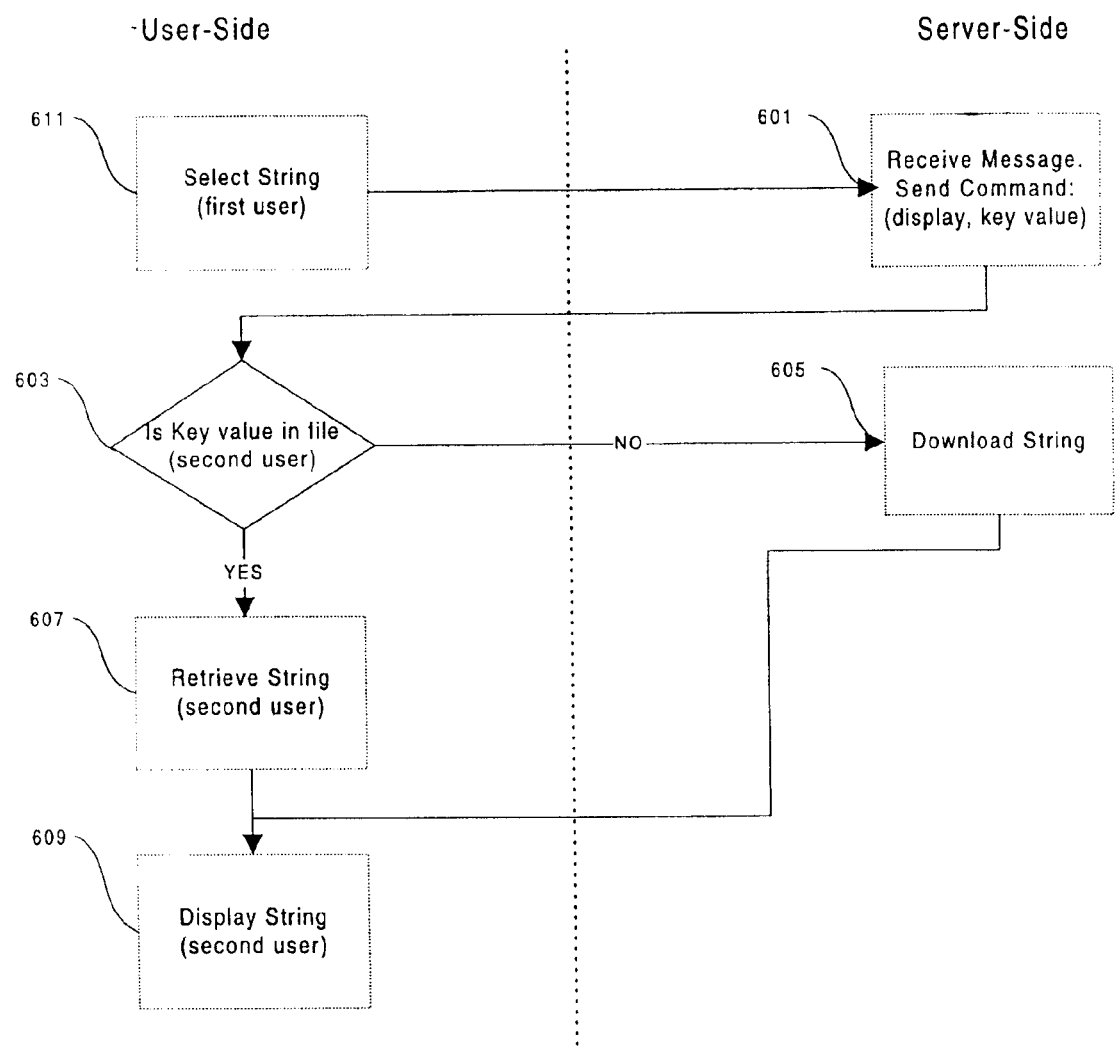

FIG. 5 depicts an embodiment for transmitting a command and a key value for an appropriate message communication;

FIG. 6 depicts an embodiment for displaying a message in an appropriate language.

DETAILED DESCRIPTION OF THE INVENTION

In the following embodiments of the invention, common reference numerals are used to represent the same components. If the features of an embodiment are incorporated into a single system, these components can be shared and perform all the functions of the described embodiments.

The preferred embodiment of the present invention operates on the Internet, and more specifically, on the World Wide Web using software applets. The software implementation environment provided by the World Wide Web is described in a number of books, including John December & Mark Ginsburg, HTML 3.2 and CGI Unleashed (1996), which is hereby incorporated by reference. The World Wide Web is based on the Hypertext Transfer Protocol (HTTP), which is described in *Hypertext Transfer Protocol—HTTP/1.0, T.* Berners-Lee et al., Internet Request for Comments No. 1945, (1996), which is hereby incorporated by reference. The HTTP protocol uses a general connection-oriented protocol such as the Transmission Control Protocol/Internet Protocol (TCP/IP), which is described in *Internetworking with TCP/IP* 3d. ed., Douglas E. Corner, (1995), which is hereby incorporated by reference. However, the present invention is not limited to HTTP, nor to its user of TCP/IP or any other particular network architecture, software or hardware which may be described herein. The principles of the invention apply to other communications protocols, network architectures, hardware and software which may come to compete with or even supplant the state of the art at the time of the invention.

Figure 1:
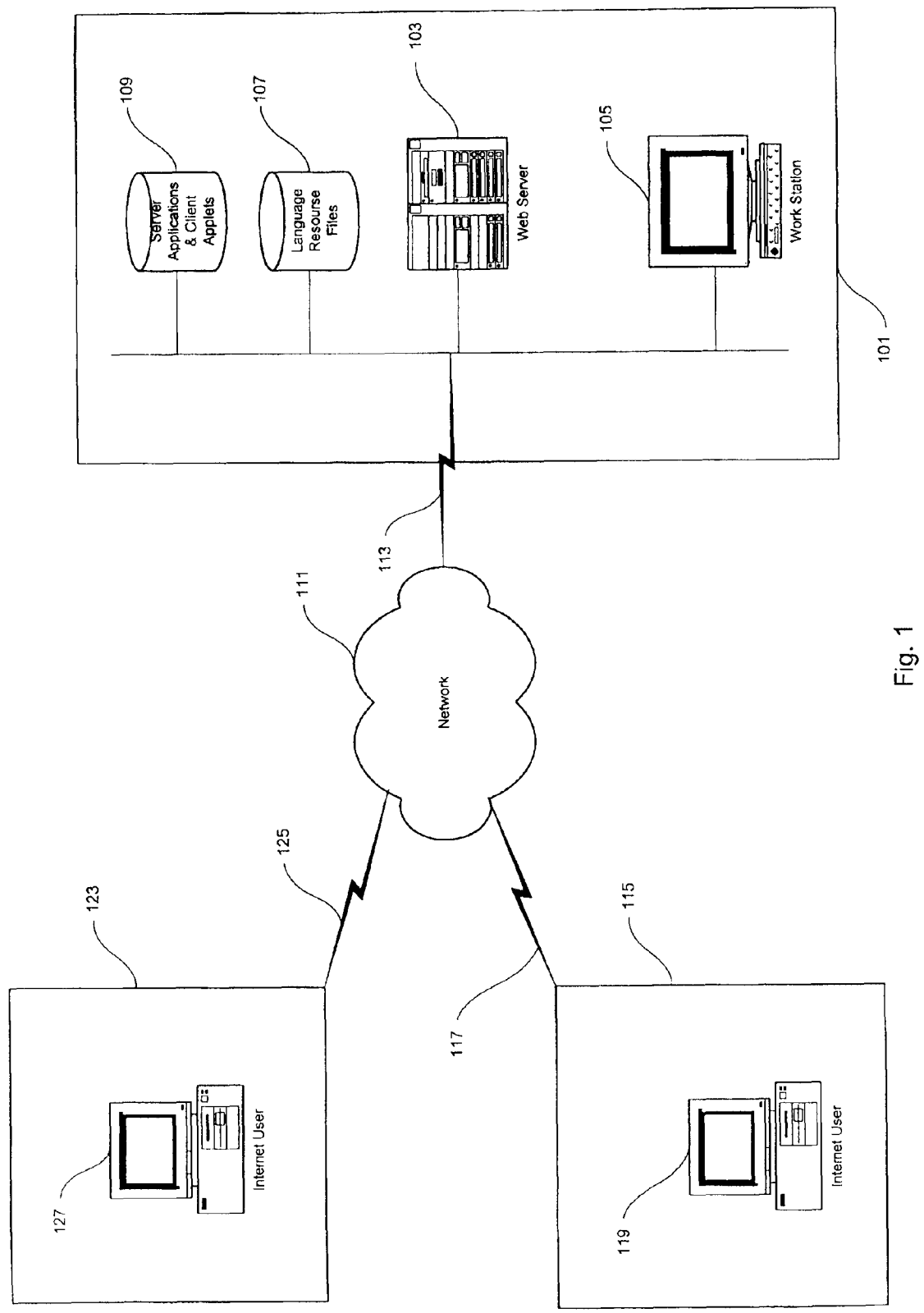
FIG. 1. details the overall architecture of the system.

FIG. 1 shows a typical network environment for interactive online communications. Typically, the network 111 is the Internet, a global computer network. An Internet user 119 connects via a communications link 117 to the Internet 111. Once connected to the Internet 111, the Internet user 119 can communicate with one or more web servers 103 which are connected to the Internet via a communications link 113. Additionally, other Internet users 127 connected to the Internet 111 via a communications link 125, may also communicate with one or more web servers 103. Because the Internet is a global communications network it allows both users and servers to be physically located at differently locations any-where around the world. For example, location 123 could be in San Francisco, location 115 in Los Angeles and location 101 in Boston.

Figure 2:
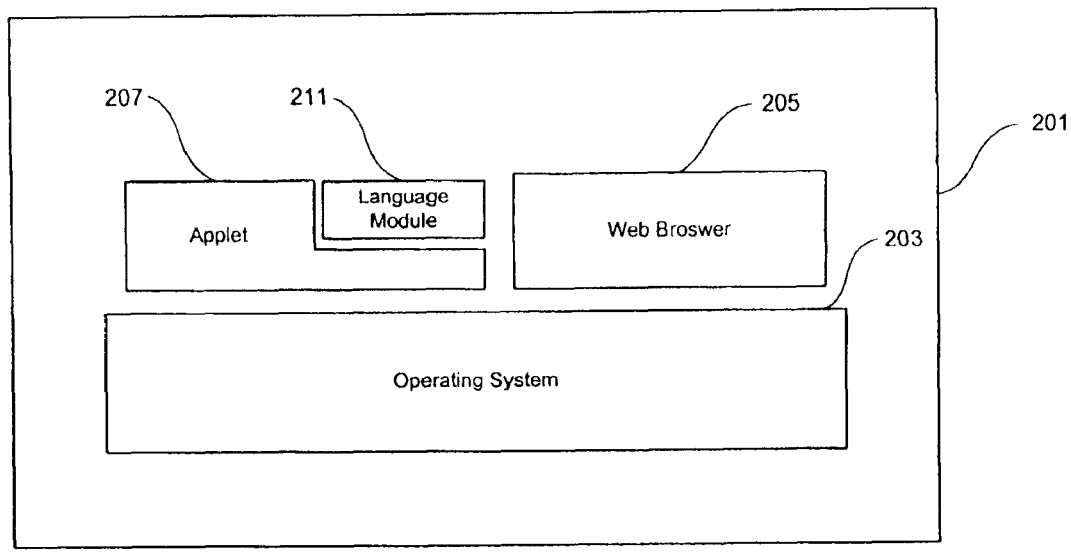
FIG. 2. details the server-side software architecture of the system.

FIG. 2 describes a typical user's computer 201 software. The computer 201 runs an operating system 203 such as Windows from Microsoft, Unix, or the like. Additionally, the user's computer 201 also executes a computer program called a Web browser (browser) 205. The browser sends out HTTP requests to one or more Web servers 103. In the requests, particular items of data, referred to as resources, which are available on servers, are referred to by means of uniform resource locators (URL's). URLs are text strings in a defined format described in Berners-Lee et al., supra. A URL includes both an identification of the server and an identification of a particular item of data within the server. Responsive to the user's request, the server(s) return responses to the user's browser, and the browser 205 acts upon those responses, generally by displaying the requested content to the user.

The content portion of the responses can be a "Web page," expressed in hypertext markup language (HTML). HTML can also include instructions to the browser to display bitmap-format images and other URL links (also known as anchors and hyperlinks) interspersed within the web page. The responses can also include more complex commands to be interpreted by the browser (i.e., commands which result in an execution of a script). HTML itself does not define complex commands, rather they are considered to belong to separately-defined scripting languages. One common scripting language is JavaScript, which is further defined in *Javascript: The Definitive Guide*, David Flanagan, (1998), which is hereby incorporated by reference.

In addition to executing scripts it is also possible to extend the function of a browser with compiled code. One method to extend the functionality of a browser is by use of compiled code to assist the browser in performing additional functions, typically enabling in-line display of content by the browser. This "helper" code is referred to as a "plug-in," typically includes additional function libraries and additional file format support for various graphics files.

Another more powerful method used to extend the functionality of the browser is by means of using compiled code which executes as a stand-alone application. Such compiled code is typically referred to as an "applet." While applets are stand-alone applications, they sometimes utilize the display functionality inherent within the browser to display their output. Applets may also be executed with any interaction with a web browser.

Applets 207 are typically stored on a mass storage device 109 and downloaded from the web server 103 over the network 111 to the user's computer 201 by the web browser 205. Once downloaded, the applet runs on the user's computer 201 and provides additional features and operations not otherwise available.

Figure 3:
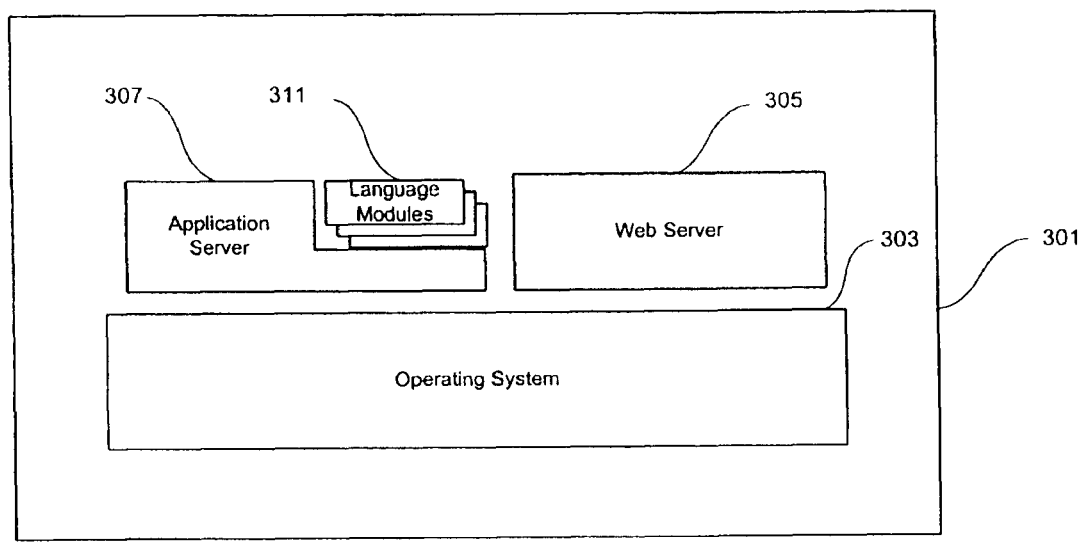
FIG. 3. details the client-side software architecture of the system.
Figure 4:
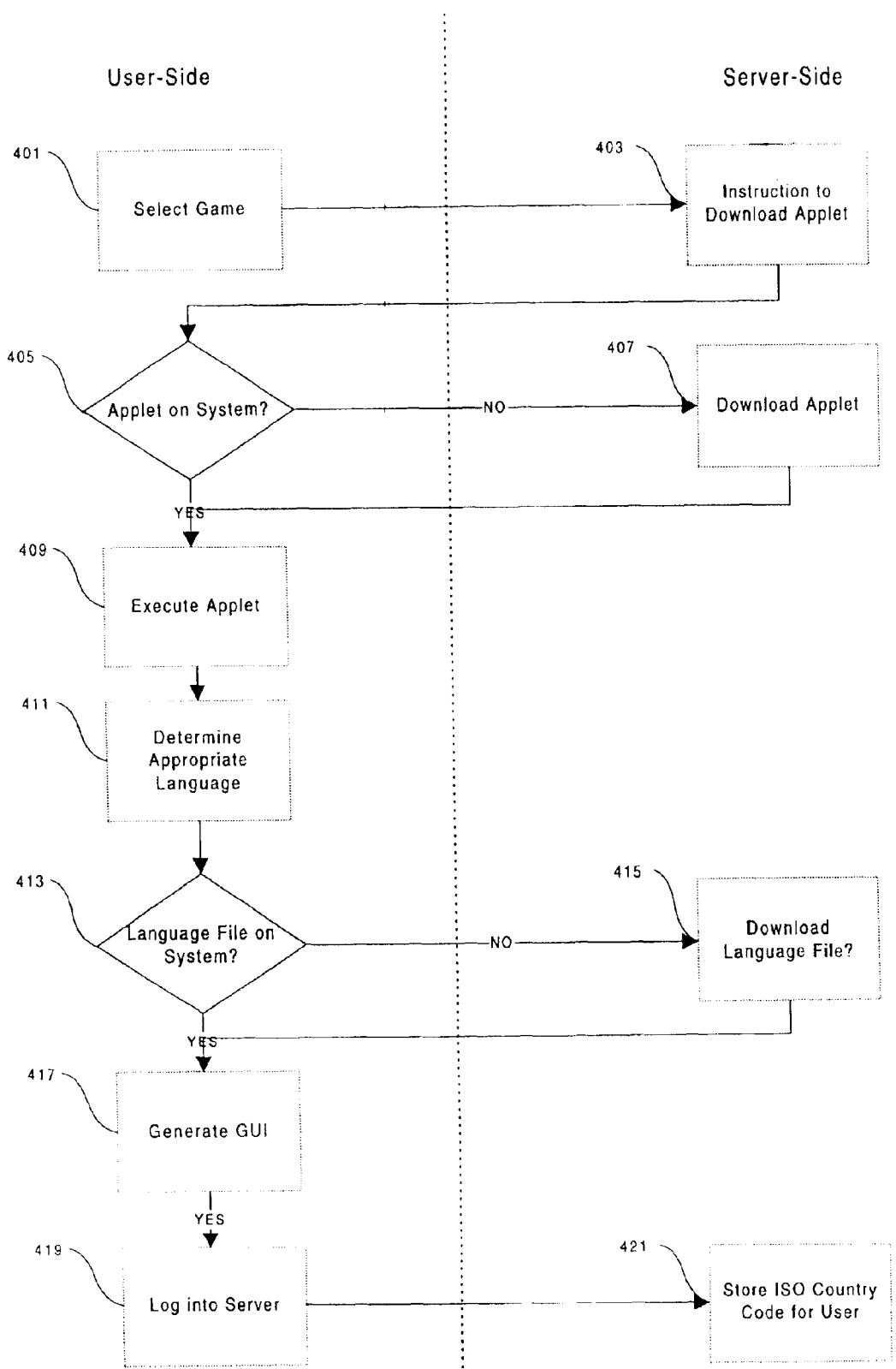
FIG. 4. depicts a sample language resource file.

FIG. 3 depicts a typical server 301 software. The server 301 runs an operating system 303 such as Microsoft NT Server (Microsoft and NT are trademarks of Microsoft Corporation) or Unix or the like. Additionally, the server 301 also executes web server software 305 such as Apache (Apache is open-source web server software, whose development is overseen by the Apache Software Foundation). The server responds to user's HTTP requests with particular items of data, referred to as resources, which are available on the server 301. Additionally, the server may also execute task-specific server side applications 307. These applications interact directly with user applets 207, providing content and servicing the task-specific requests from user a server side application 307 runs directly atop the operating system software 303. Direct communication between the server side application and user applets occurs using a communications path, such as TCP/IP, which is handled by the operating system 303 and its network daemon. As is well known in the art, the server functions, including web server and applications server functions, may be distributed to multiple machines, or performed on a single machine, in any combination.

In FIG. 2, the language module 211 contains language information which the applet uses to interface with the user in their desired language. The language modules are either complied into the applet or, in another embodiment, is a database file or DLL file. The latter embodiments provide for realtime updates to the language file without recompiling or downloading a new applet.

In FIG. 3, the language modules 311 contain language information which the server side application uses to interface with users in their desired language. The language modules are either complied into the server side application or, in another embodiment, is a database file or DLL file. Additionally, server side language modules can be segmented or organized into several files, or cached in the server's memory.

The user's language module file 211 provides all needed language (words and phrases) to the server side applet 207. In FIG. 3, a server's language module 311 provides all needed language (words and phrases) to the application 307. A sample text-based server language module is shown in appendix A. A sample text-based user language module is shown in appendix B. In the preferred embodiment, the server's language module file contains words and phrases in multiple languages, whereas the user's language module file contains only a subset of words and phrases in one language. In another embodiment, both the server's language module file contains words and the user's language module contains words and phrases in multiple languages. In yet another embodiment, the server's language module file contains words and phrases in multiple languages, whereas the user's language module file contains only a subset of words and phrases in multiple languages. Many other embodiments exist where the data contained in the language module files on the server and on the user side are sets and subsets of the other. As is well known in the art, this design approach allows for tailoring the size and content of the language module files to meet the needs of the application. Additionally, either file may be stored in binary or text based file format, and in one or many data files.

As shown in Tables A and B, each language modules file is a table containing sets of 3 corresponding values. A key value, corresponding international country codes, and corresponding strings of text. The key values are unique integers which allow the identification of a phrase or word, without respect to any specific language. Put another way, a key value identifies a phrase or word in every language. Further, each a key value represents only one single meaning. For example, the phrase "cool" has several meanings in English. First, its literal meaning relating to temperature; second, a slang, loosely meaning "good;" a second slang, loosely used to describe a person who is unflappable or composed; and yet another slang describing someone who is not friendly. These meaning, however, do not translate literally in the United Kingdom. Therefore, by assigning only one key value to each meaning, the correct meaning can be related in every country.

The corresponding international country code identifies the language of the particular string of text, either a word or phrase. These codes often take the form of: "us" for the United States, "es" for Spain, "fr" for France, "de" for Germany, etc. These codes are maintained by ISO 3166 Maintenance Agency (ISO 3166/MA), and the authoritative list is kept under publication ISO 3166-1. Additionally, other codes not approved by the ISO Maintenance Agency can be created for locations without a code, or to support countries with more then one language or dialect. In another embodiment of the invention, entire sets of unique codes can be created to further categorize the available languages.

The corresponding strings of text are words or phrases. A different string can exist for each corresponding country code allowing the present invention to translate each occurrence of a word or phrase to its meaning in every language. Further, as each a key value represents only a single meaning, errors in translations from one language to another are completely eliminated.

FIG. 1 depicts Internet users and servers which situated at three different locations (namely, 101, 115, and 123). Of course, if the network 111 is a global communications network, such as the Internet, then the users and servers may be located around the world; each may use a multitude of languages. The web server 103 may be programmed using a programming workstation 105, to interact with users in a multitude of languages. The web server 103 may also employ one or more methods to determine in which language it will use to interact with a given user.

The web server 103 may be programmed to use a default language such as English allow the user to select the desired language from a list. Additionally, the web server 103 may determine which language should be used. One method to determine which language should be used is to use the language of the web server where the user was visiting just prior to visiting the current web server. Often, web browsers report the Uniform Resource Locator (URL) of the server users are coming from to the new server. Using this information and a table of other web server's default language, the new web server may be able to determine which language should be used with a user. For example, if the Internet user is redirected to the web server 103 by a web site which is known to be a French language web site the web server may determine that French is the user's preferred language.

Another method used to determine the proper language of users is by setting a "cookie" (a small data file stored on the user's computer which stores certain data, such as a default language). In the instant embodiment, the user is prompted to select a language and this is selection is stored in an "cookie." "Cookies" are typically set by a server the first time a user visits the server and are only readable by that server. Once this "cookie" is stored on the user's computer, the web server can determine which language the user prefers each time the user visits again. Additional methods include using an applet or plugin to query the user's operating system registry database.

Once the web server 103 has determined the appropriate language it may then display web pages and content in the appropriate language. Additionally, once the web server 103 has determined the appropriate language, a user's request for an applet can be serviced by providing an applet pre-compiled with regional language module that corresponds to the user's desired language, or by serving the proper language resource file for use by the applet.

The following example details one embodiment of the invention. More specifically, the example details an application of the invention for interactive online computer gaming. The invention is well suited for this application because many users of interactive online computer games come from many different areas around the world. Because users prefer to interact with the online game environment in their native language the system must support and use many different languages.

The user turns on their computer to 202 and loads the computers operating system 203. Next, the user executes a web browser 205 and begins communications with one or more Internet web servers. The user then instructs their web browser 205 to access the online interactive game providers web server 103. Specifically, the user navigates to the providers online game area and initiates the sequence to play an online game by clicking on an appropriate HTML link corresponding the online game they wish to play. In this example, the user will choose to play the popular card game "Hearts".

In block 401, the user selects the game "Hearts" and then in block 403 the web server 305 sends the browser 205 an instruction to download the "Hearts" game applet for execution on the user's PC. The user's browser 205, having received the URL and instruction from the web server 305 to download the applet, first checks to see if the applet has already been downloaded to the user's computer. In block 405, if the applet has been downloaded previously and is stored on the user's computer, the browser 205 may check to see whether or not the stored applet has the same date and revision as the applet the server suggested the browser 205 download. If the user has already downloaded the applet and it is stored on the hard drive, then in block 409 the applet is executed by the user's computer 201. If the user has not downloaded the applet then in block 407 the browser follows the URL and retrieves or downloads the applet. Then in block 409 the browser or applet user executes the 207.

Once the applet is 207 executed the applet runs as a stand alone application on the users's computer. During the 201 applet's initialization process the applet 207 performs several steps. First, in block 411 the applet 207 determines the appropriate language for the user, using one or more of the methods discussed above. Second, in block 413 the applet 207 queries whether or not the appropriate language resource module file 211 is stored on the users computer 201. If the language resource module file 211 is not stored on the local computer 207, in block 415 the applet initiates communication with the application server 300 and downloads the appropriate language resource module file 311. Third, in block 417 the applet generates its user interface (this is often a graphical user interface or GUI). The GUI is constructed using the language specific information contained within the language resource module file 211. Accordingly, all of the dialog, application menus, and command and interactivity between the applet 207 and the user is done in the appropriate language. Fourth, in block 419 the applet initiates a log-in sequence with the application server, 307 prompting the user were necessary to supply a user name and/or password. Additionally, in block 421 during the log-in sequence the applet 207 communicates to the application server 307, the appropriate ISO country code thereby designating the user's selected language.

After the applet 207 has concluded its start-up procedures and logged into the application server 307 the applet 207 begins interacting with the user in the appropriate language. The application server 307 communicates to the applet 207 which displays to the user, a list of available players with whom the user may interact. Specifically, in this example, the Internet user, 119, may play the card game of "Hearts" with one or more other Internet users 127. After the required number of users (e.g., 119, 127, etc.) have been selected, the application server 307 instructs the users applets 207 to begin the game. Throughout the course of the game each user's applet 207 interacts directly with the application server 307 and displays the state of the game to the users on their display. Additionally, the applet 207 passes necessary commands made by a user directly to the application server 307.

During the course of the game the application server 307 may initiate communication directly with each user. Each communication is embedded with a command from the application server 307 to the applet 207. This communication includes a command instructing the applet 207, that the application server 307 wishes the applet 207 to display a message to the user. The command is followed by the key value for the appropriate message. For example, at the start of the game it is appropriate for each user to select three cards to pass to the player on their right. Accordingly, at the start of the game, in block 501 the application server 307 sends the command to display a message followed by the key value corresponding to that message as shown in Table A to each user. In this case, the appropriate key value is I00001. Accordingly, in block 503 each applet 207 will look up the key value in their language resource file 211. If the key value is not in the language resource file, in block 505 the applet will request the string from the application server 307. In block 507 if the key value is in it the language resource file the applet will retrieve the string corresponding key value I00001 from the file. Next, in block 509 the applet will display the string.

In addition, the server may communicate to the users a message whose string is not stored in the language resource module file. In this situation the application server transmits a command notifying the applet 207 to display the string which follows. This transmission concludes with a traditional End Of Line (EOL) character notifying the applet 207 of the end of this string.

Similar to the communication originated by the application server 307 destined for the user, users may Initiate communication as well. For example, one Internet user 119 wishes to compliment a second Internet user, 127 on an excellent move. Accordingly, in block 611 a first user would select from a drop down box the message the user chooses to send to a second user. The user's applet 207 would generate a message to the server that this message should be passed on to a specific user and transmit the message to the server. Much like the manner in which the application server 307 communicates to the user, this message from the applet would contain the appropriate key value. As shown in Table A the corresponding key value for such a message is I000027 which correlates to the text string "Shot the moon." In identical fashion, as a message received from the server, the user's applet for the Internet user receiving the message would display the appropriate string of text in the appropriate language.

Accordingly, in block 601 the application server 307 sends the command to the second user to display a message followed by the key value corresponding to that message as shown in Table A on the second users computer. In block 603 the second user's applet 207 will look up the key value in the language resource file 211. If the key value is not in the language resource file, in block 605 the applet will request the string from the application server 307. In block 607 if the key value is in the language resource file the applet will retrieve the string corresponding key value I000027 from the file. Next, in block 509 the applet will display the string.

In some situations it may be advantageous not to store all or some of the language resource files at the user side. Accordingly, one embodiment of the invention allows the server to supply many, or even all, of the strings to the user. Thus, the language resource file at the user side is reduced to a subset of the typical language resource file. In this embodiment the server stores a list of which strings the language resource files contains, and then transmits the needed strings directly to the applet. In another embodiment with a reduced language resource file, the server may not keep record, but instead, first transmit the key value. If the applet does not have the key value stored it can reply to the server requesting it transmit the string. Logic in the applet can decide whether or not to store, or cache this string value for future use.

The following example details a second embodiment of the invention. More specifically, the example details an application of the invention for multi-language online communications between two or more computer programmers working on a collaborative project. The invention is well suited for this application because many computer programmers come from many different areas around the world. Because programmers prefer to interact with each other in their native language the system must support and use many different languages.

The programmer (a.k.a. "user") turns on their computer to 202 and loads the computers operating system 203. Next, the user executes a web browser 205 and begins communications with one or more Internet web servers. The user then instructs their web browser 205 to access the collaborative project web server 103. Specifically, the user navigates to the collaborative project online communications area and initiates the sequence to communicate with another programmer by clicking on an appropriate HTML link corresponding to communicate with the programmer. In this example, the user will choose to communicate with the user "Bob".

When the user selects the game "Bob" the web server 305 sends the browser 205 an instruction to download the communications applet 207 for execution on the user's PC. The user's browser 205, having received the URL and instruction from the web server 305 to download the applet, first checks to see if the applet has already been downloaded to the user's computer. If the applet has been downloaded previously and is stored on the user's computer, the browser 205 may check to see whether or not the stored applet has the same date and revision as the applet the server suggested the browser 205 download. If the user has already downloaded the applet and it is stored on the hard drive, then the applet is executed by the user's computer 201. If the user has not downloaded the applet then the browser follows the URL and retrieves or downloads the applet. Then the browser or applet user executes the 207.

Once the applet is 207 executed the applet runs as a stand alone application on the users's computer. The applet is used to facilitate interactive communication between the programmers. During the 201 applet's initialization process the applet 207 performs several steps. First, the applet 207 determines the appropriate language for the user, using one or more of the methods discussed above. Second, the applet 207 queries whether or not the appropriate language resource module file 211 is stored on the users computer 201. If the language resource module file 211 is not stored on the local computer 207, the applet initiates communication with the application server 300 and requests the appropriate language resource module file 311. Third, the applet generates its user interface (this is often a graphical user interface or GUI). The GUI is constructed using the language specific information contained within the language resource module file 211. Accordingly, all of the dialog, application menus, and command and interactivity between the applet 207 and the user is done in the appropriate language. Fourth, the applet initiates a log-in sequence with the application server, 307 prompting the programmer were necessary to supply a user name and/or password. Additionally, during the log-in sequence the applet 207 communicates to the application server 307, the appropriate ISO country code thereby designating the user's selected language.

After the applet 207 has concluded its start-up procedures and logged into the application server 307 the applet 207 begins interacting with the user in the appropriate language. The application server 307 communicates to the applet 207 which displays to the user, a list of available programmers with whom the user may communicate. Specifically, in this example, the Internet user 119, may communicate with "Bob" or with one or more other Internet users 127. Throughout the course of the communication each user's applet 207 interacts directly with the application server 307 and displays the communications of the other programmers on the their displays. Additionally, the applet 207 passes necessary commands made by a user directly to the application server 307.

During the course of the communication the application server 307 may initiate communication directly with each programmer. Each communication is embedded with a command from the application server 307 to the applet 207. This communication includes a command instructing the applet 207, that the application server 307 wishes the applet 207 to display a message to the user. The command is followed by the key value for the appropriate message. For example, a programmer may has closed their connection with the communications server their right. Accordingly, the application server 307 sends the command to display a message followed by the key value corresponding to a message to the programmer. In this case, the appropriate key value would have a corresponding string such as, "programmer "Bob" has closed their connection with the communications server." Accordingly, each applet 207 will display the string for the corresponding key value to their user in the proper language. Additionally, the server may communicate to the users a message whose string is not stored in the language resource module file. In this situation the application server transmits a different command notifying the applet 207 to display the text which follows. This transmission concludes with a traditional End Of Line (EOL) character notifying the applet 207 of the end of this string.

Similar to the communication originated by the application server 307 destined for a programmer, programmers may initiate communication as well. For example, if one Internet user 119 wishes to send a message to another Internet user, 127 asking a question Internet user 119 would select from a drop down box the message containing the appropriate question. The user's applet 207 would generate a message to the server that this message should be passed on to a specific user. Much like the manner in which the application server 307 communicates to the user, this message from the applet would contain the appropriate key value which correlates to the text string of the question. In identical fashion, as a message received from the server, the user's applet for the Internet user receiving the message would display the appropriate string of text in the appropriate language.

In some situations it may be advantageous not to store all or some of the language resource files at the user side. Accordingly, one embodiment of the invention allows the server to supply many, or even all, of the strings to the user. Thus, the language resource file at the user side is reduced to a subset of the typical language resource file. In this embodiment the server stores a list of which strings the language resource files contains, and then transmits the needed strings directly to the applet. In another embodiment with a reduced language resource file, the server may not keep record, but instead, first transmit the key value. If the applet does not have the key value stored it can reply to the server requesting it transmit the string. Logic in the applet can decide whether or not to store, or cache this string value for future use.

In a similar application, namely multi-language online communications between two or more computer programmers working on a collaborative project, the server function can be run on each users' computer. This can be achieved by either incorporating the functions into each applet, or by executing a stand alone application server on each computer. Accordingly, using this method, the invention provides for multi-language online communications between two or more computer users without the need of a dedicated server. Coordination of language resource files can be achieved by use of a web server, however, this server need not be interactively involved in the multi-language online communications.

In the instant embodiment, language resource files stored on the client may contain more then one language (i.e., strings that correlate to more then one country code). The additional languages can be used to send directly to others users.

In another embodiment server interaction may be removed once the applets have received the needed language resource files and initiated communications. For example, after the applets have determined the address and language resource files needed to communicate, message need not be routed to the server for delivery.

TABLE A

| key value | int. code | string |
|---|---|---|
| 100013 | us | You may not lead a heart until hearts are broken. |
| 100013 | fr | Vous ne pouvez pas poser de coeur jusqu'à ce que quelqu'un ait ouvert à coeur. |
| 100013 | es | No puede jugar un corazón si alguien no ha jugado otro corazón. |
| 100013 | de | Sie können erst dann Herz ausspielen, wenn Herz schon einmal gespielt wurde. |
| 100015 | us | The outcome of the hand is still in doubt. |
| 100015 | fr | Le résultat du jeu est toujours aléatoire. |
| 100015 | es | Es La mano aún no está decidida. |
| 100015 | de | De Das Ergebnis der Hand ist immer noch fraglich. |
| 100016 | us | You must lead the two of clubs. |
| 100016 | fr | Vous devez poser le deux de trèfle. |
| 100016 | es | Debe jugar el dos de tréboles. |
| 100016 | de | Sie müssen die Pik 2 ausspielen. |
| 100027 | us | Shot the moon.\n |
| 100027 | fr | A fait un déménagement à la cloche de bois.\n |
| 100027 | es | Ha alcanzado la luna.\n |
| 100027 | de | De hat sich davongemacht.\n |
| 100038 | us | Click three cards and then click 'Pass' |
| 100038 | fr | Cliquez sur trois cartes, puis sur Passer |
| 100038 | es | Haz clic en tres cartas y después en 'Pasar' |
| 100038 | de | Klicken Sie auf drei Karten und dann auf 'Passen' |
| 100039 | us | Has claimed the remaining points. |
| 100039 | fr | A réclamé les points restants. |
| 100039 | es | Ha reclamado los puntos restantes. |
| 100039 | de | Wurden die übrigen Punkte gutgeschrieben. |
| 100042 | us | Final score. |
| 100042 | fr | Score final. |
| 100042 | es | Puntuación final. |
| 100042 | de | Final score. |
| 100047 | us | You must pass exactly three cards. |
| 100047 | fr | Vous devez passer exactement trois cartes. |
| 100047 | es | Debe seleccionar tres cartas. |
| 100047 | de | Sie müssen genau drei Karten passen/weitergeben |
| 100050 | us | Game Over. |
| 100050 | fr | Partie terminée. |
| 100050 | es | Fin de partida. |
| 100050 | de | Spiel beendet. |
| 100064 | us | Options for Hearts table. |
| 100064 | fr | Options pour la table de Dame de pique. |
| 100064 | es | Opciones para Corazones. |
| 100064 | de | Optionen für Hearts-Tisch. |

TABLE B

| key value | int. code | string |
|---|---|---|
| 100013 | us | You may not lead a heart until hearts are broken. |
| 100015 | us | The outcome of the hand is still in doubt. |
| 100016 | us | You must lead the two of clubs. |
| 100027 | us | Shot the moon. |

TABLE B-continued

| key value | int. code | string |
| --- | --- | --- |
| 100038 | us | Click three cards and then click 'Pass'. |
| 100039 | us | Has claimed the remaining points. |
| 100043 | us | NO PASS. |
| 100047 | us | You must pass exactly three cards. |
| 100050 | us | Game over. |
| 100064 | us | Options for Hearts table. |

What is claimed is:

1. A method comprising:
   communicating with a network server via a network;
   receiving, at a computing device, a selection of a word or phrase;
   converting, via the computing device, the word or phrase into at least one unique key value using a conversion table, the conversion table comprising at least one language key for at least one language and at least one text phrase corresponding to the language key and the unique key value; and
   communicating the unique key value to the network server over the network.

2. The method of claim 1, wherein the conversion table further comprising a subset of information corresponding to information contained on a server conversion table.

3. The method of claim 2, wherein the conversion table contains fewer language keys than the server conversion table.

4. The method of claim 1, wherein the selection of the word or phrase being a selection from a drop-down menu from a set of predetermined text.

5. The method of claim 4, wherein the set of predetermined text being supplied by the network server.

6. The method of claim 1, wherein the selection of the word or phrase being an input text value.

7. The method of claim 1, wherein the network server being one of a plurality of network servers.

8. The method of claim 7, wherein the network server being a web server.

9. The method of claim 1, further comprising:
   said converting being a real-time event that occurs substantially simultaneously upon said receiving the selection of the word or phrase.

10. The method of claim 1, wherein said communicating with the network server further comprising a multi-player online gaming environment.

11. A method comprising:
    communicating with a network server via a network;
    receiving, at a computing device, a unique key value from the network server, the unique key value being a conversion of a word or phrase;
    translating, via the computing device, the received unique key value via a conversion table; and
    visibly displaying the word or phrase in an appropriate language on a display of the computing device.

12. The method of claim 11, wherein the conversion table comprising:
    at least one language key for at least one language; and
    at least one text phrase corresponding to the language key and a unique key value.

13. The method of claim 12, wherein said translating further comprising:
    searching the conversion table for the converted word or phrase according to the received unique key value and the language key of the conversion table.

14. The method of claim 11, wherein said communicating with the network server further comprising a multi-player online gaming environment.

15. The method of claim 11, further comprising:
    said translating being a real-time event that occurs substantially simultaneously upon the first user receiving the selection of the word or phrase.

16. The method of claim 13, wherein the second conversion table further comprising a subset of information corresponding to information contained on a network server conversion table the server conversion table comprising at least one language key for at least one language and at least one text phrase corresponding to the language key and a unique key value.

17. The method of claim 16, wherein the conversion table contains fewer language keys than the server conversion table, wherein a user requests absent information lacking in the conversion table from the network server for said translation if required.

18. The method of claim 11, wherein the network server being one of a plurality of network servers.

19. The method of claim 18, wherein the network server is a web server providing language resource files for said converting and said translating.

20. A method comprising:
    communicating with a first user computer and a second user computer via a network;
    receiving, a computing device, a unique key value from the first user computer;
    converting, via the computing device, the unique key value into a word or phrase using a server conversion table, the server conversion table comprising a unique key value for each of a plurality of unique words or phrases, a language key for a plurality of languages, and a plurality of text phrases each corresponding to a language key and a unique key value, and
    transmitting, over the network, the word or phrase to the second user computer for display.

21. The method of claim 20, wherein said converting corresponds to a language key of the second user computer using the server conversion table.

22. The method of claim 20, wherein the server conversion table further comprising text phrases for only one language.

23. The method of claim 20, wherein said connecting further comprising:
    transmitting to the first user computer and the second user a message whose text is not stored in a language key of a conversion table for the first user computer and the second user, the first and second conversion tables comprise at least one language key for at least one language and at least one text phrase corresponding to the language key and a unique key value.

24. The method of claim 23, wherein a command to display the text is transmitted to the first user computer and the second user, wherein the command comprising an appropriate key value that correlates to the text.

25. The method of claim 20, wherein the network comprising a plurality of network servers.

26. A computer-readable storage medium tangibly encoded with computer-executable instructions, that when executed by a computing device, perform a method, comprising:
    communicating with a first user computer and a second user computer via a network;
    receiving a unique key value from the first user computer;
    converting the unique key value into a word or phrase using a server conversion table, the server conversion table comprising a unique key value for each of a plurality of unique words or phrases, a language key for a plurality of languages, and a plurality of text phrases each corresponding to a language key and a unique key value; and transmitting the word or phrase to the second user computer for display over the network.

27. The computer-readable storage medium of claim 26, wherein said converting corresponds to a language key of the second user computer using the server conversion table.

28. The computer-readable storage medium of claim 26, wherein the server conversion table further comprising text phrases for only one language.

29. The computer-readable storage medium of claim 26, wherein said connecting further comprising:

transmitting to the first user computer and the second user a message whose text is not stored in a language key of a conversion table for the first user computer and the second user, the first and second conversion tables comprise at least one language key for at least one language and at least one text phrase corresponding to the language key and a unique key value.

30. The computer-readable storage medium of claim 29, wherein a command to display the text is transmitted to the first user computer and the second user, wherein the command comprising an appropriate key value that correlates to the text.

31. The computer-readable storage medium of claim 26, wherein the network comprising a plurality of network servers.

* * * * *